United States Patent
Rautila et al.

(10) Patent No.: US 6,549,625 B1
(45) Date of Patent: Apr. 15, 2003

(54) METHOD AND SYSTEM FOR CONNECTING A MOBILE TERMINAL TO A DATABASE

(75) Inventors: Heikki Rautila, Espoo (FI); Jan Kåll, Espoo (FI); Kalevi Ratschunas, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/339,116

(22) Filed: Jun. 24, 1999

(51) Int. Cl.[7] .................................................. H04L 9/00
(52) U.S. Cl. ........................ 380/258; 380/270; 713/155; 705/27
(58) Field of Search ................................. 455/406, 426, 455/432; 705/26, 27, 77; 713/155; 380/258, 270

(56) References Cited

U.S. PATENT DOCUMENTS

| | | | | |
|---|---|---|---|---|
| 5,727,057 A | * | 3/1998 | Emery et al. | 379/16 |
| 5,796,351 A | * | 8/1998 | Yabuki | 235/383 |
| 6,202,060 B1 | * | 3/2001 | Tran | 707/104.1 |
| 6,250,548 B1 | * | 6/2001 | McClure et al. | 235/51 |
| 6,298,218 B1 | * | 10/2001 | Lowe et al. | 455/310 |
| 6,324,404 B1 | * | 11/2001 | Dennison et al. | 455/406 |
| 6,353,929 B1 | * | 3/2002 | Houston | 705/7 |
| 6,397,057 B1 | * | 5/2002 | Malackowski et al. | 455/406 |

\* cited by examiner

*Primary Examiner*—Gilberto Barrón
*Assistant Examiner*—Benjamin Lanier
(74) *Attorney, Agent, or Firm*—Antonelli, Terry, Stout & Kraus, LLP

(57) ABSTRACT

The invention is a communication system (10) and a method of communication. The communication system includes an information source (20); a position transceiver (14) disposed at a broadcast location (16) and coupled to the information source, the position transceiver broadcasting information from the information source within a broadcast area (18) where the position transceiver is located, the information including identification information relating to the information source; a mobile terminal (12) within the broadcast area comprising first and second transceivers (44 and 46), the first transceiver communicating with the position transceiver; a network (42) communicating with the second transceiver; and a database (26), communicating with the network, storing information which is transmitted to the second transceiver associated with the identification information in response to the database receiving at least the identification information by transmission of the network from the mobile terminal to the database.

67 Claims, 4 Drawing Sheets

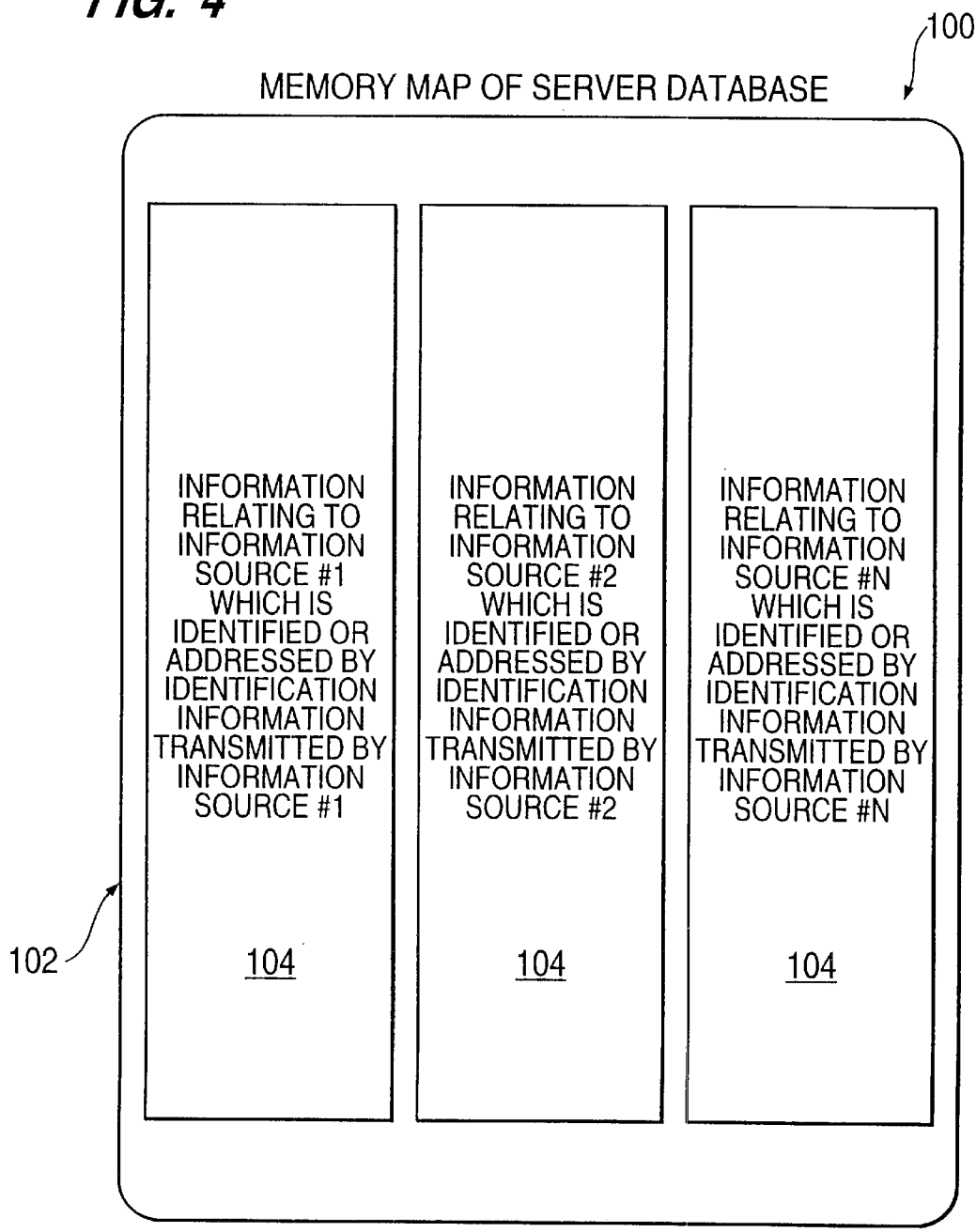

METHOD AND SYSTEM FOR CONNECTING A MOBILE TERMINAL TO A DATABASE

BACKGROUND OF THE INVENTION

1. Field of the Invention

The invention relates to a system and method for transmitting information to a mobile terminal from an information source which transmitted information is transmitted by the mobile terminal to a database to fetch information associated with the transmitted information stored in the database for transmission back to the mobile terminal.

2. Description of the Prior Art

Advertisement media in publicly travelled places have the objective of obtaining the interest of a passerby. Typically, advertisements contain information which is directed to the consumer to obtain the consumers interest and further provide contact information, such as a telephone number or a fax number, where further information about the advertised goods or services may be obtained. Since the advent of IP networks (e.g., the internet), a uniform resource locator (URL) reference is also typically given in advertisements which enables the user to download information to a computer from an IP network about the advertisement to provide a more detailed consideration of the advertised goods or services.

Additionally, systems have been proposed in which the location of a user controls the accessing of an information source, such as a server based service. These systems may use a GPS receiver or a mobile telephone to provide the user's location to a system to control accessing of the information source which is particular to the users location.

Location services and location based services are becoming more important in telecommunication networks. It is possible to localize and indicate the position of a mobile telephone used, for example, for emergency calls. Many existing and new telecommunications services will benefit from knowing the position of the terminal being used. The drawback in current and planned telecommunications networks is that it is not possible to determine the position of the terminal being used or in an idle state a accurately enough for all types of position dependent services in all circumstances. The achievable position determining accuracy is around 100 m within a cellular network and around 10 m with GPS. Not all mobile terminals will have GPS functionality.

Mobile terminals, which utilize cellular communications, are suitable for connecting a user to a website or other database to obtain information. The obtaining of information by a mobile terminal typically uses a linkage between a cellular telephone network to which the terminal subscribes and an IP network. However, the user of a mobile terminal, in order to access advertisement information or other sources of information, is required to write down from the advertisement the information for linking the mobile terminal to the website or other database, and use that information to connect the mobile terminal to an IP service provider to fetch information from the website or database. While it is possible to link an advertisement with a mobile terminal using cellular communications, such a cellular linkage has the disadvantage in highly crowded places, such as airports, of requiring substantial network capacity to link the advertisement to a large number of persons carrying mobile terminals which are passing by the advertisement.

Low power RF systems have been proposed, e.g. Bluetooth, for providing communications between a number of transceivers without or in a local area network by a short range radio link having a broadcast range of a few meters. Such systems will be commercially available in the near future and are designed to operate in open spectrum, e.g. 2.4 gigahertz.

Additionally, low power optical communication systems using an infrared carrier have been proposed which will provide a linkage between a number of transceivers over a short range. These systems will perform functions similar to Bluetooth.

SUMMARY OF THE INVENTION

The present invention is a communication system and a method of communication which provides connectivity between at least one information source which provides information, such as information relating to location based services, at least one mobile terminal and at least one database. With the invention, at least one position transceiver is disposed at a broadcast location and is coupled to the information source. The information source provides information to the position transceiver which is broadcast to the at least one mobile terminal.

The position transceiver overcomes the location problems of the prior art by indicating and transmitting its own very exact predefined position to at least one mobile terminal within range and which is able to receive this information. The at least one mobile terminal can then communicate this position to a network and servers connected to the network to access information, such as information related to or part of position dependent services offered to the user of the mobile terminal.

In one preferred embodiment of the invention, the position transceiver is connected to a network server by fixed telephone lines or wireless connections. This connectivity enables the network server to update the information which is broadcasted by the position transceiver.

In another preferred embodiment of the invention, the information which is broadcasted is changed using a keyboard of the position transceiver or a PC connected to the position transmitter. The position transmitter only accepts appropriately authenticated changes.

The position transceiver can broadcast information to the mobile terminal continuously or on request of the user of the mobile terminal or only when the position transceiver recognizes by any known mechanism that a mobile terminal or a mobile user of the mobile terminal is in the vicinity of the position transceiver.

The at least one position transceiver broadcasts information directed to the user of each mobile terminal to induce the user to communicate with the at least one database to retrieve information stored in each database over a network. The information broadcast by each position transceiver includes identification information which is related to and identifies the information source and which is transmitted by the mobile terminal over the network to the at least one database to address or identify the information in each database which is transmitted by the network back to the mobile terminal to enable the user thereof to use the retrieved information which is associated with the information source at the broadcast location. A display, which is part of each mobile terminal, enables the user to selectively review the information broadcast from a plurality of position transceivers and choose which information sources in each database from which the user wishes to obtain additional information associated with any of the identification information broadcast from the position transceivers. The broadcast information, may without limitation, be diverse types of information such as, but not limited to, advertising information and includes identification information relating to the source of the broadcast information.

Each mobile terminal is located within a broadcast area defined by the broadcast range of the at least one position transceiver located at a broadcast location. The at least one position transceiver preferably has a limited broadcast range so that the broadcast range is limited within the optical view of the users of the mobile terminals as they pass by the broadcast location.

Each mobile terminal is a multimode transceiver which operates in short range and cellular modes, and includes first and second transceivers. The first transceiver communicates with at least one position transceiver and receives broadcasts therefrom which preferably are of limited range. While not limited thereto, the first transceiver may use a low power optical or RF broadcast communications to connect each position transceiver at the broadcast location to the first transceiver and the information source. A network communicates with the second transceiver which may be, without limitation, a cellular network connected to an IP network. Each database communicates with the network and stores information which is transmitted to the second transceiver of each mobile terminal associated with the identification information.

In a preferred operational mode of the present invention, the user of the mobile terminal passes within the broadcast area of at least one position transceiver disposed at a broadcast location. Each position transceiver either continually broadcasts information to the broadcast area, which permits each user of a mobile terminal to view with a display which is part of the mobile terminal information received by the first transceiver thereof which is being broadcast to the user, such as advertisement information and the identification information, which is used to fetch the information stored in each database by transmission from the second transceiver by the network to each database or broadcasts upon demand of the user of the mobile terminal to the mobile terminal.

Each mobile terminal includes a processor and associated memory. The associated memory stores the information received from each position transceiver by the first transceiver permitting the user of the mobile terminal at the time of reception or at a later time to utilize the second transceiver to connect to addressable areas in each database using the identification information transmitted to the first transceiver.

The identification information which is used to retrieve information for transmission to the second transceiver may be of many different types. For example, the identification information may be a function of a geographic position of the broadcast location at which each information transceiver is located and may comprise one or more of geographical coordinates, the elevation of the broadcast location, an address of the broadcast location, including street address, or a pointer, or a uniform resource locator, which is an address or provides an identification of the information stored in the database associated with the identification information. While the invention is not limited thereto, the network in a preferred embodiment includes a cellular telephone network which is connected to an IP network which facilitates transmission by the transmission control protocol/internet protocol (TCP/IP).

In a preferred embodiment of the present invention, the broadcast location includes a plurality of information sources and a plurality of position transceivers disposed at the broadcast location respectively coupled to a different one of the plurality of information sources. Each position transceiver broadcasts information including identification information relating to one of the information sources from the broadcast location. The broadcast location includes a display which displays information relating to the information which is broadcast including the identification information broadcasted by each of the plurality of position transceivers. Each database stores information which is transmitted to the second transceiver associated with the identification information of the plurality of position transceivers in response to each database receiving at least the identification information by transmission by the network from the mobile terminal to each database.

A billboard type display may be utilized to display advertisement information or other information from a plurality of information sources which are viewed from a public place, such as an airport, through which multiple users of mobile terminals pass to attract their attention in a classic advertising manner. The billboard may continuously broadcast via the plurality of position transceivers over a limited range (low power) RF or optical transmission medium information which is directed to the passersby with mobile terminals from each of the information sources. An activation switch may be associated with each of the information sources to permit the passers by to selectively activate the position transceiver associated with the information source to which the passerby is attracted by display of information on the billboard type display. Finally, the broadcast may be activated by detecting the presence of the passersby by a known mechanism, such as a motion detector, to activate the position transceivers to broadcast the information.

There are numerous applications for the position transceiver besides transmitting advertisement information. These additional applications are: emergency calls; navigational services in which the user of the mobile terminal is provided information how to travel from point A to point B; calibration of the location of the mobile terminal in a cellular network and calibration of the cellular network to determine location of mobile terminals; location based services, e.g. printing a document at the closest available printer; informing the user of the mobile terminal of special services available only at the broadcast location of the position transmitters, such as special telecommunications services; transmission of price information about goods and services and payment information, the user of the mobile terminal in response thereto sends the requested payment as a short message service (SMS) to a network server, and the position transceiver in response thereto receives payment acknowledgment from the network server receiving the payment and transmits the payment acknowledgment to the user of the mobile terminal and provides a transmission permitting the user of the mobile terminal to have access to the purchased goods or services.

A method of transmitting data in a communications system including an information source, a position transceiver coupled to the information source and disposed at a broadcast location, a mobile terminal within a broadcast area, the mobile terminal comprising first and second transceivers with the first transceiver communicating with the position transceiver, a network communicating with the second transceiver and at least one database, communicating with the network and storing information associated with the identification information includes broadcasting information including identification information relating to the information source with the position transceiver to the first transceiver within the broadcast area; transmitting at least the identification information from the second transceiver with the network to the database; and in response to the database receiving at least the identification information, transmitting from the database the stored information associated with the identification information to the second transceiver. The identification information comprises information which is a function of a geographic position of the broadcast location which may be one or more of geographical coordinates, elevation of the broadcast location, an address of the broadcast location, which may be a street address, and further, a location within the street address, or a pointer, or a uniform resource locator which is an address of or identifies the information associated with the identification information in the database.

In a preferred embodiment of the method, the broadcast location comprises a plurality of information sources; a plurality of position transceivers disposed at the broadcast location respectively coupled to a different one of the plurality of information sources, each position transceiver broadcasting information including identification information relating to one of the information sources from the broadcast location; and a display which displays information relating to the information broadcasted by each of the plurality of position transceivers. Information which is stored in the database is transmitted to the second transceiver associated with the identification information of the plurality of position transceivers in response to the database receiving at least the identification information by transmission by the network from the second transceiver of the mobile terminal to the database. The information which is broadcasted from each of the plurality of position transceivers may include a webpage or application software which is executed by a processor in the mobile terminal which controls the first and second transceivers. The application software may comprise without limitation a program for opening a window or a web browser for searching the information stored in the database identified by the identification information.

The broadcasted information may be encrypted. The position information transmitted from the second transceiver to the database may be signed by the user of the mobile terminal of when the information was transmitted from the information transceiver to the mobile terminal to indicate the user's current location to permit database verification that the user is where the user should be; and the database checks validity of the signature, decrypts the information which is received from the network and checks validity of the time stamp and if the time stamp and signature are valid, the database transmits the stored information associated with the identification information with the network to the second transceiver.

The plurality of position transceivers of the broadcast location may cease to broadcast the information when the plurality of information transceivers are moved. A device may be provided at the broadcast location which senses when the plurality of position transceivers are moved and which disables transmission of the information when movement is sensed. The device for sensing movement may be of diverse designs and may be a mechanical connection between the information transceivers and a physical location at which the information transceivers are located which, when opened, disables their normal function, e.g. by disconnecting electrical power. As an alternative, the position transceiver can start transmitting an error indication if the position transceiver is moved.

In a preferred embodiment of the method, each position transceiver broadcasts the information with a limited range RF carrier or a limited range infrared carrier and the network comprises a cellular telephone network and an IP network.

BRIEF DESCRIPTION OF THE DRAWINGS

FIG. 4 illustrates a memory map of a preferred embodiment of the database of the system of FIG. 1.

Like reference numerals identify like parts throughout the drawings.

DESCRIPTION OF THE PREFERRED EMBODIMENTS

Figure 1:
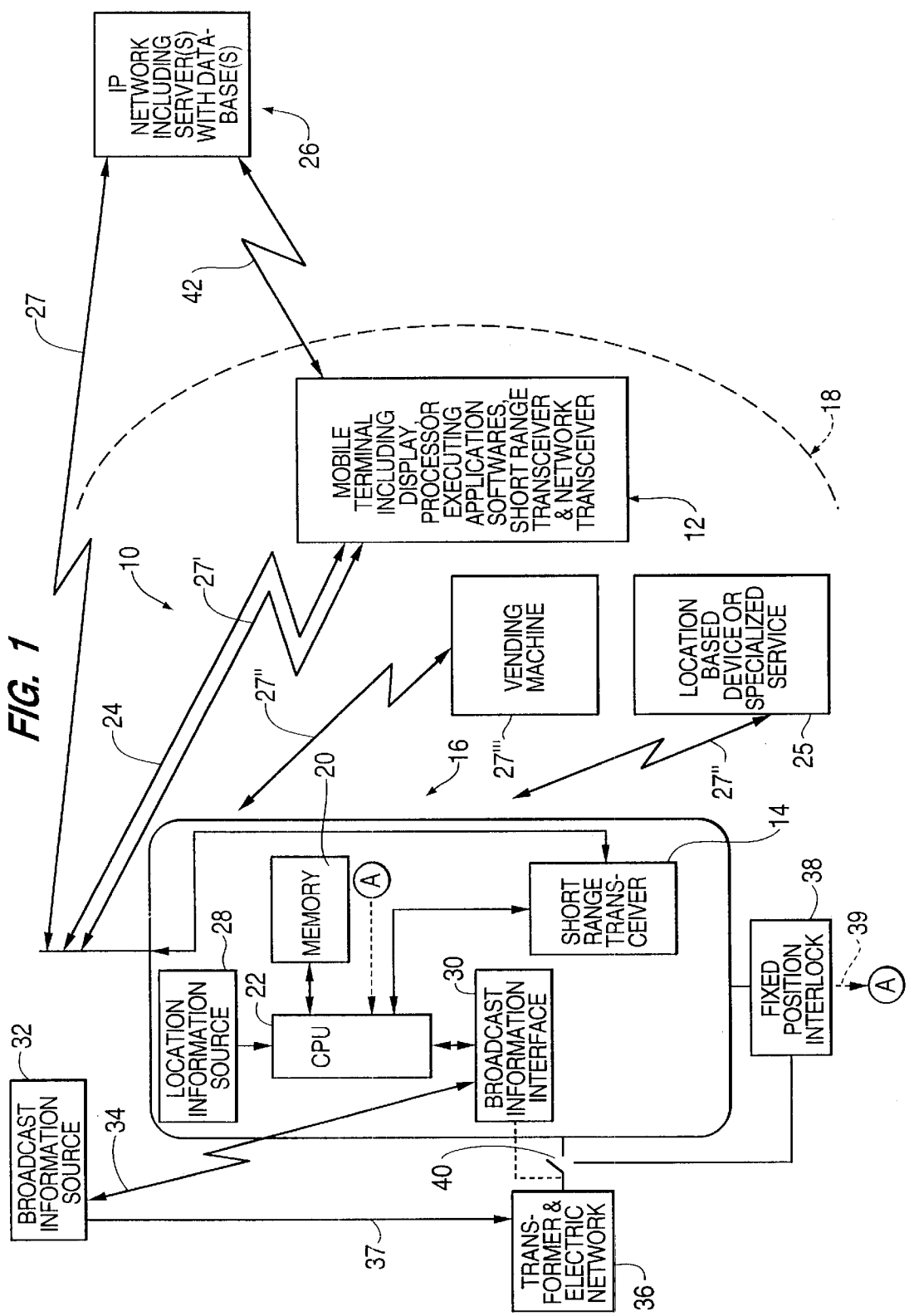
FIG. 1 illustrates a system diagram of an embodiment of the present invention.
Figure 2:
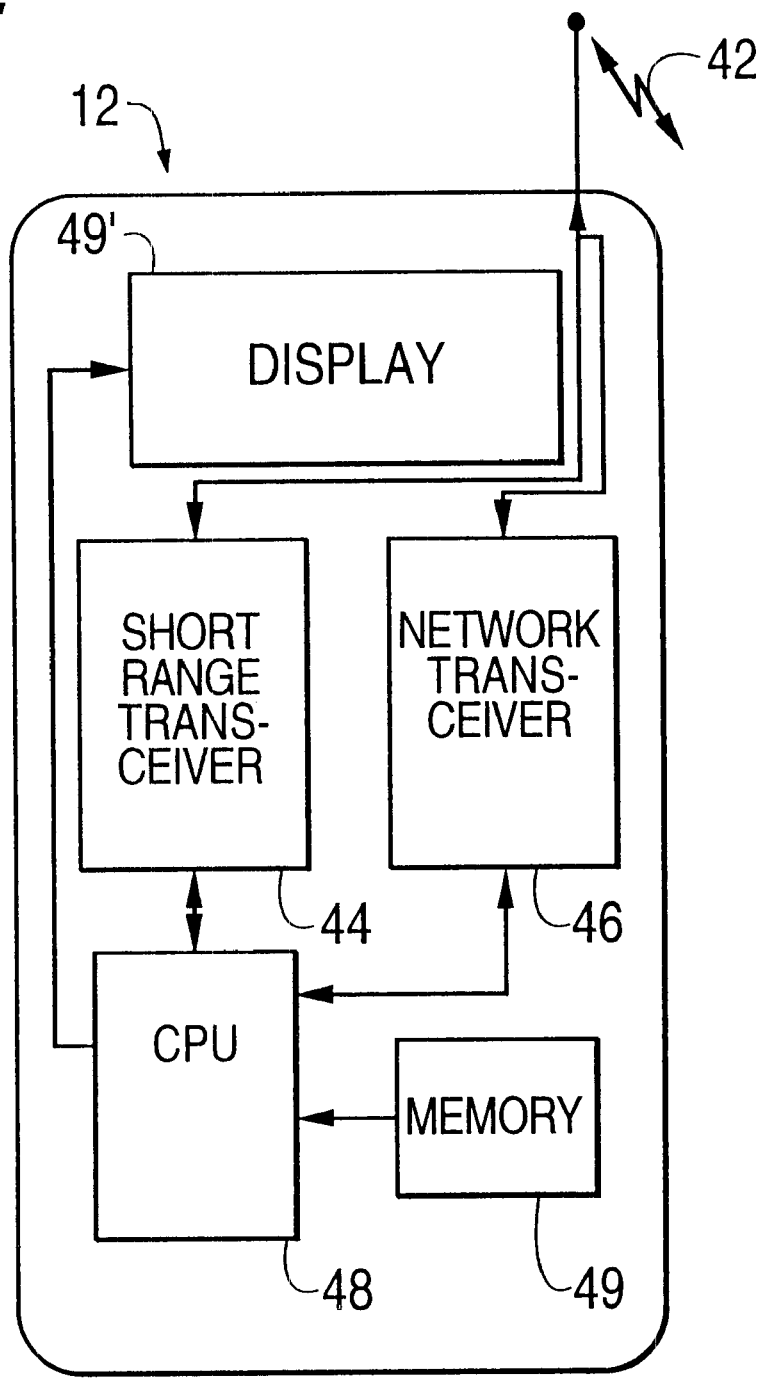
FIG. 2 illustrates a schematic diagram of a mobile terminal in accordance with the present invention.

FIG. 1 illustrates a communication system 10 in accordance with the present invention. The communication system 10 provides a mechanism by which a user of a mobile terminal 12 receives information broadcast by a position transceiver 14 which without limitation has a short (limited) range and which is part of a broadcast location 16 which broadcasts information within a broadcast area 18. Only one position transceiver 14 is illustrated, but it should be understood that in a preferred embodiment of the present invention, a plurality of position transceivers are part of the broadcast location as described below in conjunction with FIG. 3. The position transceiver 14 broadcasts information, which is stored in memory 20, under the control of CPU 22, by means of a low power RF or infrared link 24. In a preferred form of the present invention, the link 24 may be in accordance with the Bluetooth specification which has been proposed in unregulated spectrum, such as 2.4 GHz or known or proposed infrared communication links. In a preferred embodiment of the specification as illustrated in FIG. 2, a plurality of information transceivers 14, simultaneously, on demand or upon detection of a user of the mobile terminal 12 by any known mechanism within broadcast area 18, broadcast information via the low power RF or infrared link 24 to one or more mobile terminals 12 located within the broadcast area.

The information which is broadcast via the link 24 is diverse in nature and includes identification information. The information which is broadcast by at least one position transceiver 14 includes without limitation advertisements, information relating to making emergency calls, information relating to providing navigation services to enable a user of the mobile terminal 12 to move from a first position to a second position, information for calibrating a position of the mobile terminal 12 within a cellular network providing connection to the network transceiver therein or for calibrating the network positioning determination function, information relating to location and location based devices or services 25 which are proximate to the broadcast location and the mobile terminal from which the user of the mobile terminal receives goods or services after communication of the mobile terminal with a database within IP network including servers with database 26, such as printing a document by a closest available printer, information informing a user of the special services, such as telecommunications available only at the location of the position transceiver with the advertisement information including a price of goods or services and a requested form of payment indication with the user sending with the mobile terminal the requested form of payment to the database using a short message system (SMS) format and the network transmitting acknowledgment of payment 27 from the database to the position transmitter 14 and the position transmitter transmitting the acknowledgment 27' of payment to the user of the mobile terminal and access 27" location based device or specialized service 25 or to machine 27'" providing the purchased goods or receiver.

Broadcast advertising information may be diverse in nature. Advertising information may be a webpage and identification information which provides the mobile terminal 12 with the ability to access an IP network, including server(s), with database 26 and specifically, information stored in the database associated with the identification information transmitted from the position transceiver 14 to the mobile terminal 12 via link 24. The identification information provides an address of the server, database, or a portion of the database at which the information associated with the identification information is stored.

The broadcast location 16 further includes a location information source 28, which may be a GPS receiver which informs the CPU 22 of the physical location of the position transceiver 14, to provide the CPU with one possible form of the identification information which is a function of the geographic position of the broadcast location, e.g. geographical coordinates, and the elevation of the broadcast location. Alternatively, the physical location may be programmed into the memory 20 at the time of setup of the system and entered by keyboard and a PC. The identification information may be a physical address of the broadcast location, such as the street address, and further information defining the location of the broadcast location 16 within the street address, such as floor and room number at which at least one position transceiver is located which is stored in the memory 20 as a consequence of this information being readily programmable. Furthermore, the identification information may be a pointer, which may be numerically based or a uniform resource locator (URL).

The function of the identification information, regardless of its content as described above, is to provide a linkage between the user of the mobile terminal 12, the information source of the information transmitted by at least one position transceiver 14 and the information which is transmitted from the database within the IP network including servers with database 26 to the mobile terminal which is associated with the identification information broadcast from the at least one position transceiver 14 by the link 24 to the mobile terminal 12.

The broadcast location 16 facilitates the diverse applications discussed above, including marketing and advertising. The broadcast location obtains the initial interest of the user of the mobile terminal 12 by the displays 50 of information associated with the broadcast location 16 as described below in association with FIG. 3, or from a display 49' in FIG. 2 associated with the mobile terminal indicating the nature of the information being transmitted from the at least one position transceiver 14 to the mobile terminal 12, e.g. a webpage, etc. The user of the terminal 12 is then induced by the initial visual contact with the displays 49' and/or 50 to contact the database within the IP network, including server (s) with database, to obtain more information associated with the identification information.

The broadcast location 16 further includes a broadcast information interface 30. The broadcast information interface 30 is coupled to the CPU 22 and associated memory 20. The memory 20 functions as the source of broadcast information after it is inputted through the broadcast information interface 30. A broadcast information source 32, which may be a server in a network, is coupled to the broadcast information interface 20 by wireline (not illustrated), RF link 34, which may be cellular or other RF communications, or through modulation of information transmitted over the electric mains 37 to transformer and electric network 36. The broadcast information source 32 may be proximate to the broadcast location 16 or remote therefrom and provides the broadcast location with the capability of having the information which is broadcast updated. Alternatively, the broadcast information source 32 may be eliminated by use of a keyboard or local PC at the location 16 to directly provide the information including identification to the memory 20 which is broadcast by the at least one position transceiver 14. A fixed position interlock 38 may be used to disable the application of electrical power from the transformer and electrical network 36 to the broadcast location 16 by opening switch 40 when the broadcast location 16 is physically moved or to cause an error message to be broadcast in response to signal 39 generated by the fixed position interlock. The fixed position interlock 38 may be, for example without limitation, a mechanical lock, hidden seals, a movement detector or magnetic sensor which, upon movement, causes switch 40 to open to disconnect electric power from the broadcast location 16 or to generate the signal 39 to cause the error message to be broadcast.

The mobile terminal 12 includes first and second transceivers which respectively are a transceiver which is connected to the broadcast location 16 via links 24 and 27 and a network transceiver, which is preferably a cellular transceiver, that is connected by RF link 42 to the IP network, including servers with database 26. However, it should be understood that the present invention is not limited to the use of a cellular network connected to an IP network including server(s) with database 26. Alternatively, the cellular network or other communication network may link the second transceiver directly to a database with or without a server.

FIG. 2 illustrates a block diagram of one form of a mobile terminal 12 which may be used to practice the invention. The mobile terminal 12 is a multimode receiver including a first transceiver 44 which communicates with the position transceiver 14 and may operate as a short range device without limitation in accordance with the Bluetooth RF specification or a limited range infrared specification and a second transceiver which operates as a network transceiver 46 which without limitation may be a cellular transceiver over which the user of the terminal 12 receives voice, PCS, etc., communications. The mobile terminal 12 has a main CPU 48 and associated memory 49 which stores the information which is transmitted and received by the first and second transceivers 44 and 46. The main CPU 48 executes softwares which transfer the information received by the first transceiver 44 to the second transceiver 46 and drives the display 49' which displays the information received from the at least one position transceiver 14 including, but not limited to, the identification information and other information for the above-identified diverse applications including advertising, such as a web page, browser, etc.

As has been described above, identification information, which is transmitted by the link 24, performs the function of addressing or identifying particular blocks of data within the database of the IP network, including servers with database 26, which are transmitted by link 42 to the network transceiver 46 within the mobile terminal 12. The information which is received from the database 26 by the network transceiver 46 enables the user of the mobile terminal 12 to obtain more detailed information about the information which is broadcast by the link 24 including display on display 49'. This function enhances the diverse applications discussed above, including an advertising function, by providing a complete linkage to the detailed source of information associated with the identification information broadcast by the broadcast location 16 stored within the database within the IP network including server (s) with database 26.

In normal operation, each mobile terminal 12, when it is within the broadcast area 18, displays on the display 49' information regarding the information being broadcast from the broadcast location 16. This enables the user of each mobile terminal 12, when multiple short range position transceivers 14 are used, to pick and choose from the information which is most interesting which is being broadcast from a plurality of information sources at the broadcast location 16. This information, which is displayed on the display 49' of the mobile terminal 12, has associated with it the identification information which is transmitted via links 24 and 42 to the database within the IP network, including server(s) with database 26, to fetch the more detailed information stored in the database which is associated with the identification information for transmission back to the users of each mobile terminal 12 to enable the users to learn of more information regarding the source of the broadcast information from the location 16. This functionality facilitates advertisement and the other applications discussed above by obtaining the attention of users of mobile terminals 12 while at the same time not having to rely upon calls being made to cellular transceivers within the broadcast area 18. With the present invention, the information that is broadcast to each mobile terminal 12 when the users are within the broadcast area 18 contains sufficient information to obtain the attention of the users and to enable the users to obtain complete access to information stored in the remote databases, such as manufacturer's information to induce a sale, which is associated with the information, which is broadcast and/or displayed at the broadcast location 16, as described below in conjunction with FIG. 3.

The CPU 48 within the mobile terminal 12, which controls overall operation thereof, coordinates the transmission of information between the broadcast location 16 and the IP network, including server(s) with database 26. The CPU 48 processes the identification information which is received by the first short range transceiver 44 from the broadcast location 16 and is transmitted by the second network cellular transceiver 46 to the IP network including server(s) with database 26. The CPU 48 provides accessability to the memory 49 therein to both of the first and second transceivers 44 and 46 so as to facilitate transmission of information between the transceivers to provide the requisite information flow.

While the invention is not limited thereto, the identification information sent by the location position 16, may contain added information for security reasons. The information which is transmitted from the broadcast location 16 by link 24 to the mobile terminal 12 may include unencrypted information and encrypted information. The encrypted information may include as part of its identifying information, a time stamp with all of the encrypted information being encrypted by a MLC public key which may be encrypted, for example, with RSA public key cryptography. The encrypted message may be signed by the user with secret key. The server in the IP network, including server(s) with database 26, checks the signature, decrpyts the transmission of information from the mobile terminal 12, and determines if the time stamp is valid. If all of this information is verified, the server within the IP network including server(s) with database 26 may conclude with a high probability that the user of the mobile terminal 12 is in fact an authorized user and provide the user of the mobile terminal 12 with access thereto.

Figure 3:
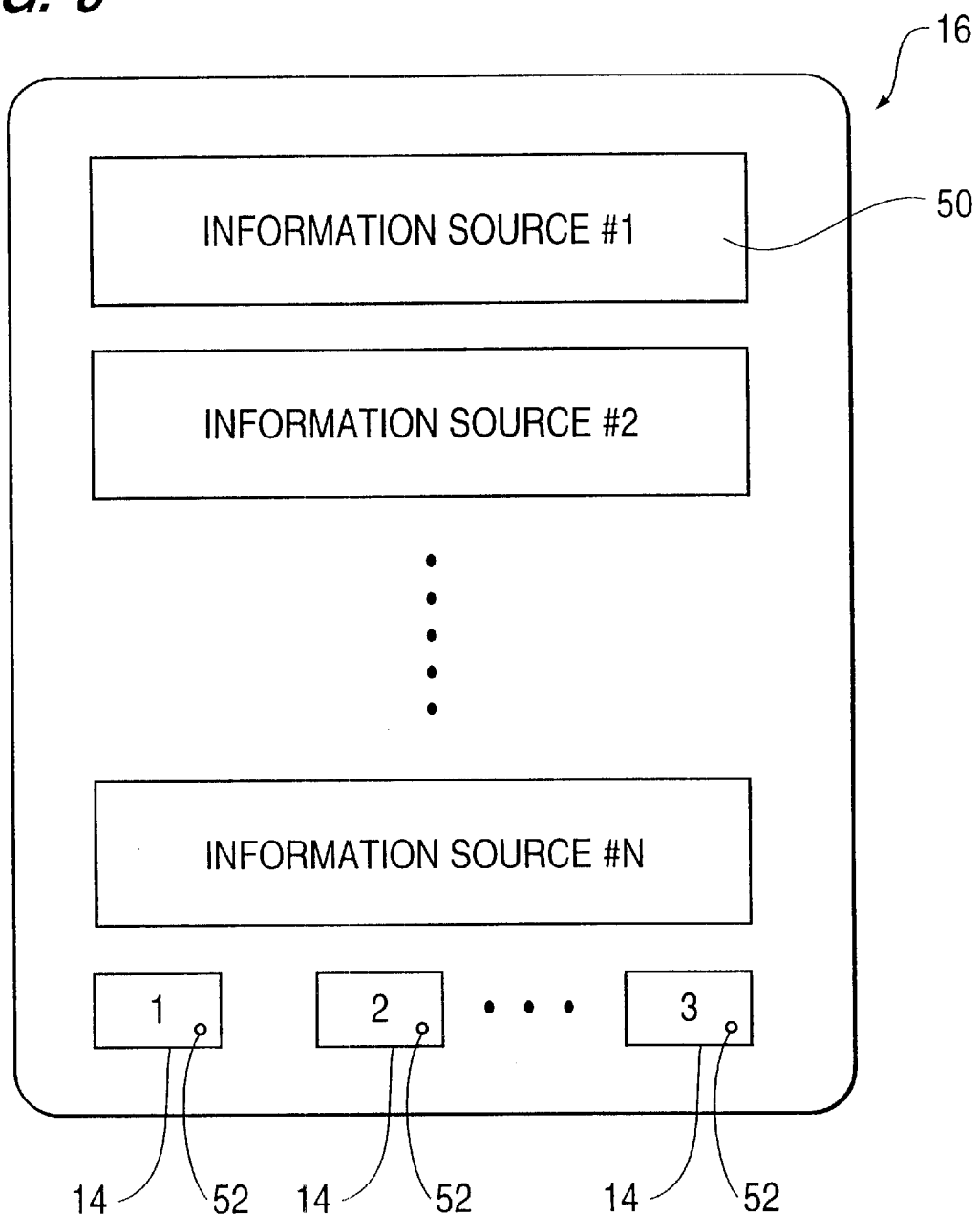
FIG. 3 illustrates a preferred embodiment of the broadcast location at which a plurality of position transceivers are located which are designed to communicate with multiple users of terminals in a public place which pass within broadcast range of the plurality of information transceivers.

FIG. 3 illustrates a preferred embodiment of the broadcast location 16. The location source 16 includes a plurality of information sources 50 which are N in number. Each information source 50 provides a display of information and has an associated display driver including processor which is designed to attract the attention of the users of the mobile terminal 12 to induce the users to communicate with the databases within the IP network, including server(s) with database 26, to obtain more detailed information associated with the identification information which is transmitted by the communication link 24. Each information source 50 is associated with a particular position transceiver 14 so that the visual impression produced by the display thereof is related to the information which is transmitted to the mobile terminals 12 and displayed on the display 49' thereof and is related to the identification information which performs the function of addressing or identifying particular information stored in the database of the IP network, including server(s) with database 26. The stored information, which is identified by the identification information, is transmitted by link 42 back to the second transceiver 46, as described below in association with FIG. 4 or via link 27 to the broadcast location 16. Each information transceiver 14 may include an on/off switch 52 which is associated with a correspondingly identified display 50 and which, upon activation by the user of the mobile terminal 12 within the broadcast area 18, causes the information, including identification information, to be transmitted by the link 24 to the user's terminal 12.

The displays 50 are a form of billboard and may contain diverse information but in environments where marketing is to be performed, the information is directed to soliciting the attention of the users of the mobile terminals 12 to obtain more information about the goods or services available for purchase which are described in the display. The particular displays 50 are not limited to any particular configuration and the overall broadcast location 16 of FIG. 3 may be located at a table with each of the individual transceivers 14 being located on the table.

FIG. 4 illustrates a memory map 100 of an individual server in the IP network including server(s) with database 26. The database 102 includes a plurality of bodies of information which are N in number which correspond to the N information sources of the broadcast location 16. Each information source 104 is addressed or identified by the identification information broadcasted over the link 24 to the mobile terminal 12 and transmitted by the network over link 42 to the server including the database 102. The server associated with the database 102, in response to the identification information, fetches a particular block of information 104 associated with the identification information. The fetched information is transmitted over communication link 42 to the mobile terminal 12 to enable the user thereof to learn more about the goods or services or other information associated with the individual information sources 50 of the broadcast locations of FIG. 2.

While the invention has been described in terms of its preferred embodiments, it should be understood that numerous modifications may be made thereto without departing from the spirit and scope of the invention as defined in the appended claims. It is intended that all such modifications fall within the scope of the appended claims.

What is claimed is:

1. A communication system, comprising:
   an information source,
   a position transceiver disposed at a broadcast location and coupled to the information source, the position transceiver broadcasting information from the information source within a broadcast area, the broadcasted information including identification information relating to the information source; and
   a mobile terminal within the broadcast area comprising first and second transceivers, the first transceiver communicating with the position transceiver and the second transceiver communicating with a network;
   wherein the identification information comprises a pointer which identifies a location of the position transceiver associated with corresponding data of the information source.

2. A communication system in accordance with claim 1 wherein:
   the identification information comprises information which is a function of a geographic position of the broadcast location.

3. A communication system in accordance with claim 2 wherein:
   the identification information comprises geographical coordinates.

4. A communication system in accordance with claim 3 wherein:
   the identification information further comprises elevation of the broadcast location.

5. A communication system in accordance with claim 2 wherein:
   the identification information comprises an address of the broadcast location.

6. A communication system in accordance with claim 5 wherein:
   the address is a street address.

7. A communication system in accordance with claim 6 wherein:
   the identification information further defines a location within the street address.

8. A communication system in accordance with claim 1 wherein:
   the identification information is a pointer which identifies a location of the position transceiver associated with corresponding data of a database where information which is transmitted to the second transceiver is stored.

9. A communication system in accordance with claim 1 wherein:
   the identification information, which is broadcasted from the position transceiver, includes a uniform resource locator which is an address of the information associated with the identification information.

10. A communication system in accordance with claim 1 wherein the broadcast location comprises:
    a plurality of information sources;
    a plurality of position transceivers disposed at the broadcast location respectively coupled to a different one of the plurality of information sources, each position transceiver broadcasting information including identification information relating to one of the information sources from the broadcast location;
    a display which displays information relating to the information broadcasted by each of the plurality of position transceivers; and
    a database storing information which is transmitted to the second transceiver associated with the identification information of the plurality of position transceivers in response to the database receiving at least the identification information by transmission of the network from the mobile terminal to the database.

11. A communication system in accordance with claim 10 wherein:
    the identification information, which is broadcasted from each of the plurality of position transceivers, includes a uniform resource locator which is an address of the information associated with the identification information in the database in the network.

12. A communication system in accordance with claim 10 wherein:
    the information, which is broadcasted from each of the plurality of position transceivers, includes a web page.

13. A communication system in accordance with claim 10 wherein:
    the information, which is broadcasted from each of the plurality of position transceivers, includes application software which is executed by a processor in the mobile terminal.

14. A communication system in accordance with claim 13 wherein:
    the application software comprises an application program for opening a window.

15. A communication system in accordance with claim 13 wherein:
    the application software comprises a web browser for searching the information stored in the database identified by the identifying information.

16. A communication system in accordance with claim 1 wherein:
    the information is encrypted.

17. A communication system in accordance with claim 16 wherein:
    the information is transmitted from the mobile terminal to a database and the transmission is signed by a user of the mobile terminal with a time stamp of when the information was transmitted from the position transceiver to the mobile terminal to indicate the user's current location to permit database verification that the user is where the user should be; and
    the database checks validity of the signature, decrypts the encrypted information which is received from the network and checks validity of the time stamp and if the time stamp and signature are valid, the database transmits the stored information associated with the identification information via the network to the second transceiver.

18. A communication system in accordance with claim 10 wherein:
    the plurality of position transceivers of the broadcast location cease to broadcast the information when the plurality of position transceivers are moved.

19. A communication system in accordance with claim 18 wherein:
    the broadcast location includes a device which senses when the plurality of position transceivers are moved and which disables transmission of the information when movement of the plurality of position transceivers is sensed.

20. A communication system in accordance with claim 1 wherein:

the position transceiver broadcasts the information with a limited range RF carrier.

21. A communication system in accordance with claim 1 wherein:

the position transceiver broadcasts the information with an infrared carrier.

22. A communication system in accordance with claim 10 wherein:

the broadcast location includes a device which senses when the plurality of position transmitters are moved; and the plurality of position transceivers transmit an error indication when the device senses the plurality of information transceivers are moved.

23. A communication system in accordance with claim 1 wherein:

the broadcasted information includes an advertisement.

24. A communication system in accordance with claim 1 wherein:

the broadcasted information includes an emergency call.

25. A communication system in accordance with claim 1 wherein:

the broadcasted information includes information providing a service to enable a user of the mobile terminal to move from a first location to a second location.

26. A communication system in accordance with claim 1 wherein:

the broadcasted information provides calibration of where the mobile terminal is located in the network.

27. A communication system in accordance with claim 1 wherein:

the broadcasted information provides position calibration of the network.

28. A communication system in accordance with claim 1 wherein:

the broadcasted information relates to services which are available to a user of the mobile terminal when the user is in a vicinity of the broadcast location.

29. A communication system in accordance with claim 1 wherein:

the broadcasted information relates to communication services which are available to a user of the mobile terminal only when the user is in a vicinity of the broadcast location.

30. A communication system in accordance with claim 1 wherein:

the broadcasted information relates to a price for goods or services and an indication where payment may be transmitted if a user of the mobile terminal wishes to purchase the goods or services; and the mobile terminal transmits payment for purchasing the goods or services to a database.

31. A communication system in accordance with claim 30 wherein:

acknowledgment of the payment is transmitted to the position transmitter and;

the position transceiver transmits the payment acknowledgment to the mobile terminal.

32. A communication system in accordance with claim 31 wherein:

the transmission of the payment acknowledgment to the mobile terminal also permits the user of the mobile terminal to have access to the purchased goods or services.

33. A method of transmitting data in a communication system including an information source, a position transceiver coupled to the information source and disposed at a broadcast location, a mobile terminal within a broadcast area comprising first and second transceivers with the first transceiver communicating with the position transceiver and the second transceiver communicating with a network, comprising;

broadcasting with the position transceiver information including identification information relating to the information source to the first transceiver within the broadcast area;

transmitting at least the identification information from the second transceiver to the network, wherein the identification information comprises a pointer which identifies a location of the position transceiver associated with corresponding data of the information source; and in response to the network receiving at least the identification information, transmitting from the network the stored information associated with the identification information to the second transceiver.

34. A method in accordance with claim 33 wherein:

the identification information comprises geographical coordinates.

35. A method in accordance with claim 34 wherein:

the identification information further comprises an elevation of the broadcast location.

36. A method in accordance with claim 35 wherein:

the identification information comprises an address of the broadcast location.

37. A method in accordance with claim 36 wherein:

the identification information further defines a location within a street address.

38. A method in accordance with claim 33 wherein:

the identifying information comprises a pointer which identifies a location of the position transceiver associated with corresponding data of a database where information which is transmitted to the second transceiver is stored.

39. A method in accordance with claim 33 wherein:

the broadcast location comprises a plurality of information sources, a plurality of position transceivers disposed at the broadcast location respectively coupled to a different one of the plurality of information sources, each position transceiver broadcasting information including identification information relating to one of the information sources from the broadcast location;

a display which displays information relating to the information broadcasted by each of the plurality of position transceivers; and information, stored in a database associated with the identification information of the plurality of position transceivers, is transmitted to the second transceiver in response to the database receiving at least the identification information by transmission by the network from the mobile terminal to the database.

40. A method in accordance with claim 33 wherein:

the identification information, which is broadcasted from the position transceiver, includes a uniform resource locator which is an address of the information associated with the identification information in a database in the network.

41. A method in accordance with claim 39 wherein:

the identification information, which is broadcasted from each of the plurality of position transceivers, includes a uniform resource locator which is an address of the information associated with the identification information in the database in the network.

42. A method in accordance with claim 39 wherein:
the information, which is broadcasted from each of the plurality of position transceivers, includes a web page.

43. A method in accordance with claim 39 wherein:
the information, which is broadcasted from each of the plurality of position transceivers, includes application software which is executed by a processor in the mobile terminal.

44. A method in accordance with claim 43 wherein:
the application software comprises an application program for opening a window.

45. A method in accordance with claim 43 wherein:
the application software comprises a web browser for searching the information stored in the database identified by the identifying information.

46. A method in accordance with claim 33 wherein:
the information is encrypted.

47. A method in accordance with claim 46 wherein:
the information is transmitted from the second transceiver to a database and the transmission is signed by a user of the mobile terminal with a secret key and includes a time stamp of when the information was transmitted from the position transceiver to the mobile terminal; and
the database checks validity of the signature, decrypts the information which is received from the network and checks validity of the time stamp and if the time stamp and signature are valid, the database transmits the stored information associated with the identification information via the network to the second transceiver.

48. A method in accordance with claim 39 wherein:
the plurality of position transceivers of the broadcast location cease to broadcast the information when the plurality of information transceivers are moved.

49. A method in accordance with claim 48 wherein:
the broadcast location includes a device which senses when the plurality of position transceivers are moved and which disables transmission of the information when movement is sensed.

50. A method in accordance with claim 33 wherein:
the position transceiver broadcasts the information with a limited range RF carrier.

51. A method in accordance with claim 33 wherein:
the position transceiver broadcasts the information with a limited range infrared carrier.

52. A method in accordance with claim 33 wherein
the network comprises a cellular telephone network and an IP network.

53. A method in accordance with claim 33 wherein:
the broadcast location includes a device which senses when the plurality of position transmitters are moved; and
the plurality of position transceivers transmit an error indication when the device senses the plurality of information transceivers are moved.

54. A method in accordance with claim 33 wherein:
the broadcasted information includes an advertisement.

55. A method in accordance with claim 33 wherein:
the broadcasted information includes an emergency call.

56. A method in accordance with claim 33 wherein:
the broadcasted information includes information providing a service to move from a first location to a second location.

57. A method in accordance with claim 33 wherein:
the broadcasted information provides calibration of where the mobile terminal is located in the network.

58. A method in accordance with claim 33 wherein:
the broadcasted information provides calibration of the network.

59. A method in accordance with claim 33 wherein:
the broadcasted information provides calibration of position determination by the network.

60. A method in accordance with claim 33 wherein:
the broadcasted information relates to services which are available to a user of the mobile terminal when the user is in a vicinity of the broadcast location.

61. A method in accordance with claim 33 wherein:
the broadcasted information relates to communication services which are available to a user of the mobile terminal only when the user is in a vicinity of the broadcast location.

62. A method in accordance with claim 33 wherein:
the broadcasted information relates to a price for goods or services and an indication where payment may be transmitted if a user of the mobile terminal wishes to purchase the goods or services; and
the mobile terminal transmits payment for purchasing the goods or services to a database.

63. A method in accordance with claim 62 wherein:
acknowledgment of the payment is transmitted to the position transmitter and;
the transceiver transmits the payment acknowledgment to the mobile terminal.

64. A method in accordance with claim 63 wherein:
the transmission of the payment acknowledgment to the mobile terminal also permits the user of the mobile terminal to have access to the purchased goods or services.

65. A method in accordance with claim 33 wherein:
the information broadcasted with the position transceiver is continuously broadcast.

66. A method in accordance with claim 33 wherein:
the information broadcasted with the position transceiver is broadcasted upon activation of the position transmitter by the user of the mobile terminal.

67. A method in accordance with claim 33 wherein:
the information broadcasted with the position transceiver detection is broadcasted when presence of a user of the mobile terminal in a vicinity of the position transmitter is detected.

* * * * *